(12) United States Patent
Manning et al.

(10) Patent No.: US 6,580,699 B1
(45) Date of Patent: Jun. 17, 2003

(54) METHOD FOR UPDATING AN R-P CONNECTION FOR A ROAMING MOBILE STATION

(75) Inventors: Serge Manning, Plano, TX (US); Jianping Jiang, Richardson, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/534,738

(22) Filed: Mar. 27, 2000

Related U.S. Application Data

(60) Provisional application No. 60/126,675, filed on Mar. 29, 1999.

(51) Int. Cl.[7] ............................................. H04Q 7/20
(52) U.S. Cl. .................. 370/331; 455/432; 455/433; 455/435; 455/436; 455/439; 370/338; 370/349
(58) Field of Search ............................. 455/432, 433, 455/435, 436, 439, 440, 522, 426, 414; 370/331, 338, 349

(56) References Cited

U.S. PATENT DOCUMENTS

| | | | | |
|---|---|---|---|---|
| 5,345,448 A | * | 9/1994 | Keskitalo .................. 370/331 |
| 5,423,068 A | * | 6/1995 | Hecker .................... 455/56.1 |
| 5,499,387 A | * | 3/1996 | Chambert .................. 455/33.2 |
| 5,577,168 A | * | 11/1996 | Haas et al. ................ 455/33.2 |
| 5,819,180 A | * | 10/1998 | Alperovich ................ 455/465 |
| 5,896,411 A | | 4/1999 | Ali et al. .................. 375/200 |
| 5,946,621 A | | 8/1999 | Chheda et al. .............. 455/440 |
| 5,974,318 A | | 10/1999 | Satarasinghe ............... 455/436 |
| 6,021,328 A | | 2/2000 | Curtis et al. ................ 455/443 |
| 6,026,301 A | | 2/2000 | Satarasinghe ............... 455/436 |
| 6,055,427 A | * | 4/2000 | Ojaniemi .................. 455/436 |
| 6,061,563 A | * | 5/2000 | Lee ........................ 455/435 |
| 6,085,107 A | * | 7/2000 | Persson et al. ............. 455/522 |
| 6,088,578 A | | 7/2000 | Manning et al. .............. 455/68 |
| 6,188,898 B1 | * | 2/2001 | Phillips .................... 455/433 |
| 6,212,380 B1 | * | 4/2001 | Laatu ...................... 455/436 |
| 6,219,547 B1 | * | 4/2001 | Qaddoura et al. ........... 455/432 |
| 6,223,035 B1 | * | 4/2001 | Pierce et al. ................ 455/433 |
| 6,243,582 B1 | * | 6/2001 | Lahtinen ................... 455/436 |
| 6,295,452 B1 | * | 9/2001 | Choi ....................... 455/436 |
| 6,321,087 B1 | * | 11/2001 | Do ......................... 455/436 |
| 6,370,379 B1 | * | 4/2002 | Rugaard .................... 455/435 |
| 6,385,451 B1 | * | 5/2002 | Kalliokulju et al. .......... 455/437 |
| 6,385,452 B1 | * | 5/2002 | Zadeh et al. ................ 455/440 |
| 2002/0021681 A1 | * | 2/2002 | Madour .................... 370/331 |
| 2002/0037712 A1 | * | 3/2002 | Shin ........................ 455/414 |
| 2002/0057658 A1 | * | 5/2002 | Lim ........................ 370/331 |
| 2002/0082013 A1 | * | 6/2002 | Lee et al. .................. 455/436 |
| 2002/0083203 A1 | * | 6/2002 | Lim ........................ 709/246 |

\* cited by examiner

*Primary Examiner*—Edward F. Urban
*Assistant Examiner*—Henry M. Quach
(74) *Attorney, Agent, or Firm*—Haynes and Boone, LLP

(57) ABSTRACT

A system and method for timely maintaining or establishing an R-P connection after a mobile station (MS) roams from the control of an old base station controller (BSC) to that of a new BSC is provided. The process may be initiated during a registration process of the MS, during an origination process, or during a termination process. A Mobile Service Center (MSC), Visitor's Location Register (VLR), or the MS may be used to store the packet data call status information including point to point protocol (PPP) session status information and configuration information about an old BSC including its related cells and PDSNs. In some cases, this information may also be transferred to the new BSC through a BSC to BSC connection.

48 Claims, 9 Drawing Sheets

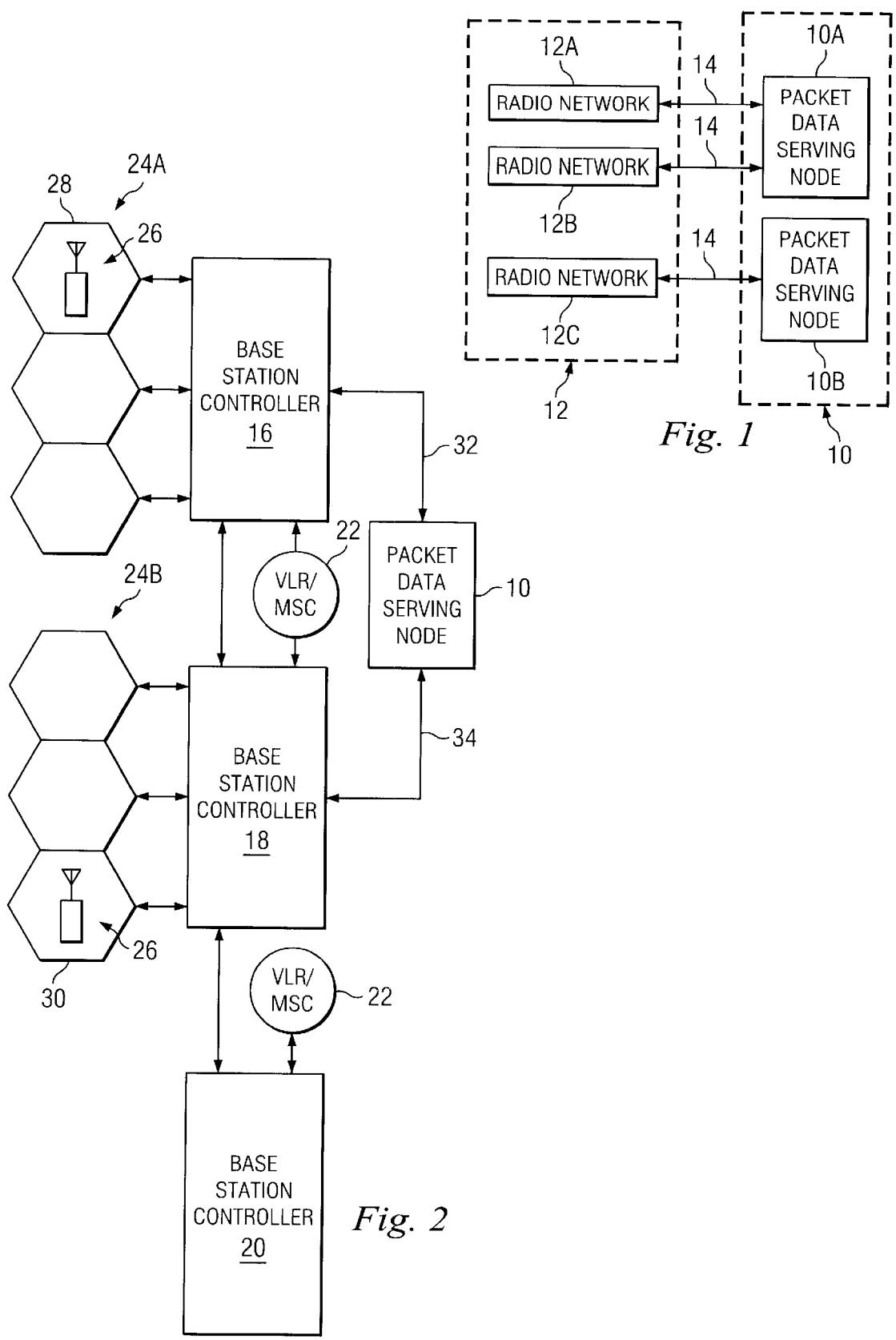

METHOD FOR UPDATING AN R-P CONNECTION FOR A ROAMING MOBILE STATION

CROSS REFERENCE

This application claims the benefit of U.S. Provisional Application Serial No. 60/126,675, which was filed on Mar. 29, 1999.

BACKGROUND OF THE INVENTION

The present invention relates generally to telecommunication systems, and more particularly, to a system and method for updating an R-P connection when a mobile station roams from one radio network to another.

In a telecommunication system, as shown in FIG. 1, a packet data serving node (PDSN) 10a or 10b usually serves multiple radio networks (RNs), e.g., 12a, 12b and 12c. On the other hand, a single RN, e.g. 12b, can be in communication with more than one PDSN. When a mobile station (MS) roams from one RN to another, a RN-to-PDSN connection (R-P connection) 14 must be updated to maintain a smooth communication channel between the RN 12 and the PDSN 10.

FIG. 2 shows a communication infrastructure describing the relationship among a PDSN 10, base station controllers (BSCs) 16, 18, and 20, Visitor's Location Registers (VLRs) or Mobile Service Centers (MSCs) 22, representative cells of radio networks 24a and 24b, and a roaming MS 26. For instance, when the MS 26 roams from one cell 28, which is under the control of the BSC 16, to another cell 30 controlled by the BSC 18, an old R-P connection 32 between the BSC 16 and the PDSN 10 may have to be updated to reflect a new R-P connection 34 between the BSC 18 and the PDSN 10. Furthermore, the MSC/VLR 22 may be in communication with both the BSC 16 and the BSC 18 without maintaining a communication channel with the PDSN 10.

In one scenario, when the MS 26 roams to a new radio network, and if a BSC serving the new radio network is under a different PDSN 10, the MS 26 may have to perform a mobile IP (M-IP) registration process. However, a race condition may happen during the M-IP registration when packets are still routed to the old network before the new M-IP registration has been completed. Hence, it is recommended by the Telecommunication Industry Association (TIA) to relay all these packets from the old radio network to the new radio network.

Although the TIA has dealt with the race condition during the M-IP registration, two other scenarios for switching the R-P connection are not contemplated by the TIA. In one scenario, the new BSC is under the same PDSN 10, but relates to a different MSC/VLR 22. As shown in FIG. 2, this could happen when the MS 26 roams into the territory of the BSC 20 from that of the BSC 16. In another scenario, the new BSC 20 is under the same PDSN 10 and relates to the same MSC/VLR 22. This occurs when the MS 26 moves from the control of the BSC 16 to the BSC 18.

Therefore, an improved method is needed for timely switching or updating an R-P connection when a MS 26 roams into a new radio network.

SUMMARY OF THE INVENTION

A system and method is provided for timely maintaining or establishing an R-P connection after a mobile station (MS) roams from the control of an old base station controller (BSC) to that of a new BSC.

In one embodiment of the present invention, a Mobile Service Center (MSC) or Visitor's Location Register (VLR) stores packet data call status information including point to point protocol (PPP) session status information and configuration information about BSCs. The information may include related cells and pocket data service nodes (PDSNs) before the MS moves to a new radio network (RN). During a registration process of the MS 26, once a Location Update Request is received from the MS 26, the MSC/VLR 22 can check whether the MS 26 is in a PPP session and whether the MS 26 is moving to a new BSC but within the same packet zone. If so, the R-P connection can be switched over. In this case, the MSC/VLR 22 will inform the new BSC to establish the R-P connection with the PDSN 10.

In another embodiment of the present invention, an R-P connection is maintained between the old BSC and the PDSN 10 during a registration process while a routing connection is made between the old BSC and the new BSC.

In another embodiment of the present invention, the MS 26, instead of the MSC/VLR 22, stores necessary information such as a PPP session indicator and a cell ID. During the registration process, the new BSC receives information about the R-P connection between the old BSC and the associated PDSN 10 from the MS 26. Upon determining that a new R-P connection is needed, the PDSN 10 establishes the new R-P connection with the new BSC.

In another embodiment of the present invention, during an origination process, the MS 26 communicates directly with the new BSC. The new BSC subsequently communicates with the MSC/VLR 22 to obtain information about the old R-P connection. The new BSC establishes a new traffic channel with the MS 26 only if needed. The new BSC also checks the PPP session status information and triggers the construction of a new R-P connection.

In yet another embodiment of the present invention, if certain conditions require (e.g., the MS 26 is at an Inter-MSC 22 boundary cell), switching the R-P connection can be avoided. The packet traffic can be routed back to the old BSC via a base station to base station (BS—BS) link. Therefore there is no need to switch the R-P connection.

In another embodiment of the present invention, an R-P connection is initiated during a mobile termination process. Information about the old BSC and its link with the PDSN 10 is transferred to the new BSC.

In another embodiment of the present invention, an R-P connection is maintained during a mobile termination process by routing the packet traffic to the old BSC. A paging process is used for setting up a traffic channel between the new BSC and the MS 26.

In yet another embodiment of the present invention, information about the old R-P connection and the associated PDSN 10 are given to the new BSC through a hard handoff process. A new R-P connection is then established.

BRIEF DESCRIPTION OF THE DRAWINGS

FIG. 1 illustrates conventional communication links among Packet Data Serving Nodes (PDSNs) and Radio Networks (RNs).

FIG. 2 illustrates a conventional communication infrastructure describing the relationship among a PDSN, base station controllers (BSCs), Visitor's Location Registers (VLRs) or Mobile Service Centers (MSCs), cells of a radio network, and a roaming MS.

DESCRIPTION OF THE PREFERRED EMBODIMENT

For the sake of illustration, it is assumed that each radio network (RN) has a packet zone identification (PZID), that all communication between the RNs and packet data session nodes (PDSNs) will be via base station controllers (BSCs), and that a PDSN 10 abandons an old R-P connection only after a new R-P connection has been established. The following description uses signaling terminology consistent with IS-2000 or TIA/EIA-95. It is understood, however, that other systems may equally employ the benefits of the present invention.

Figure 3:
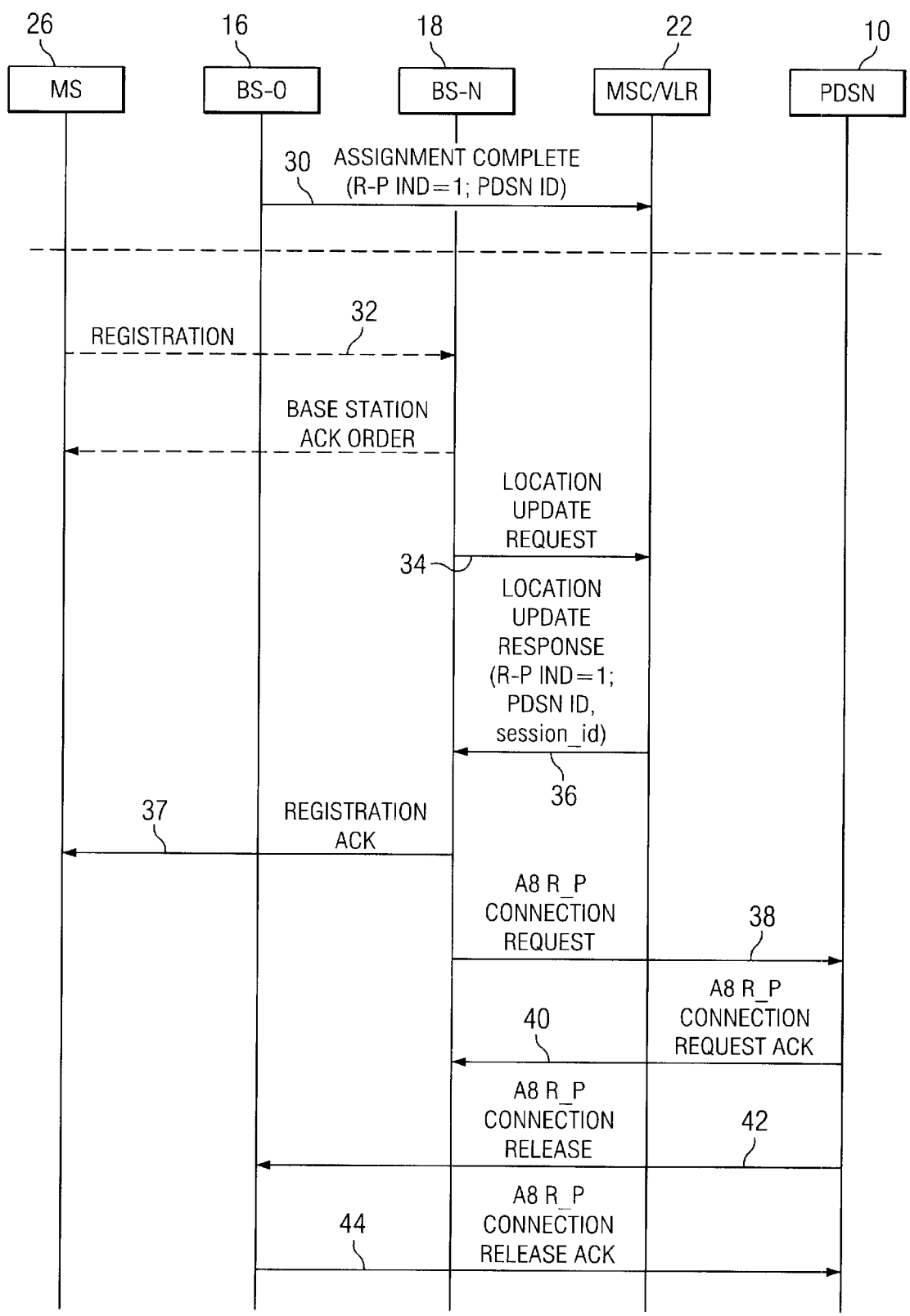
FIG. 3 is a call flow diagram according to one embodiment of the present invention in which the process for updating an R-P connection is initiated and carried out by an MS registration process through a VLR or MSC.

Referring now to FIG. 3, a call flow diagram 36 illustrates one embodiment of a process for updating an R-P connection in a wireless communication system. The call flow diagram 36 is initiated and carried out by a mobile station (MS) registration process through a Visitor's Location Registers (VLR) or Mobile Service Centers (MSC). It is understood that operations performed by the VLR 22 can also be performed by the associated MSC 22.

When the MS 26 moves from the coverage area of an old BSC (BS-O 16) to the coverage area of a new BSC (BS-N) 18, it is assumed that the MS 26 has already performed an M-IP registration in a particular packet zone. This is because the BS-N 18 is under the same PDSN 10 as the BS-O 16. The MS 26 has thus established a Point-to-Point Protocol (PPP) connection with the PDSN 10 via the BS-O 16.

At step 37, during a preceding M-IP registration, the BS-O 16 sends information about the R-P connection 32 and the associated PDSN 10 in an Assignment Complete message to the MSC/VLR 22. In this case, the MSC/VLR 22 stores the call status information including information for PPP session status and configuration information for existing BSCs, cells, and PDSNs. A parameter "PDSN ID" stores the information to identify which PDSN that the BS-O 16 is connected.

At step 38, when the MS 26 moves into the coverage area of the BS-N 18, a Registration message is triggered to be sent from the MS 26 to the BS-N 18. The mechanism to trigger the registration may include time based or zone based registration mechanisms.

At step 39, upon receiving the Registration message, the BS-N 18 constructs a Location Updating Request message and sends it to the MSC/VLR 22 through a Complete Layer 3 Information message. This message is sent to inform the MSC/VLR 22 that location information of the MS 26 may need to be updated and other appropriate efforts may be taken to assure uninterrupted service to the MS 26. Having the MS 26 register with the BS-N 18, the MSC/VLR 22 is able to check whether the MS 26 is in a PPP session and whether the MS 26 is moving to a new BSC but within the same packet zone based on its stored information.

Subsequently at step 40, the VLR 22 sends a Location Updating Response message to the BS-N 18 to include information about the R-P connection 32 (FIG. 2) and the associated PDSN 10. This information may include parameters like R-P Indicator, PDSN ID, Pre_Cel_ID, and session_ID, so that an R-P connection can be established, if needed. The session_ID is an identifier that uniquely indicates a particular instance of packet data service for a MS 26. The MS 26 may have one or more instances of packet data services simultaneously. The session_ID may also be unique for a predetermined PDSN 10 or an area served by a MSC/VLR 22 as well. Further at step 41, the BS-N 18 may transmit a Registration Acknowledge message to the MS 26 to indicate a successful registration.

At step 42, if the BS-N 18 detects the absence of an existing R-P connection between the BS-N 18 and the PDSN 10 for providing packet data services (which is needed for the next round of packet transmission), the BS-N 18 sends an R-P Connection Request message to the PDSN 10. The message is based on information the BS-N 18 has obtained from the MSC/VLR about the R-P connection between the BS-O 16 and the PDSN 10 (at step 40).

At step 43, the PDSN 10 then sets up a new R-P connection with the BS-N 18 and sends an R-P connection Request Ack message back to the BS-N 18. At step 44, once the new R-P connection 34 (FIG. 2) is completed, the PDSN 10 sends an R-P Connection Release message to the BS-O 16 to release the old R-P connection 32, and at step 45 receives a confirmation from the BS-O 16. However, in order to maintain network reliability and efficiency, it is not always preferred to establish new R-P connections. Referring again to FIG. 1 for example, if the BS-N 18 is under the RN 12b and there is no existing R-P connection with PDSN 10b, but there is one with PDSN 10a, then a new R-P connection is not preferred. Instead, the existing R-P connection can be used for communications between the RN 12b and the PDSN 10a. In this case, any new PPP session establishment and the mobile IP registration process will have to be performed by the MS.

Figure 4:
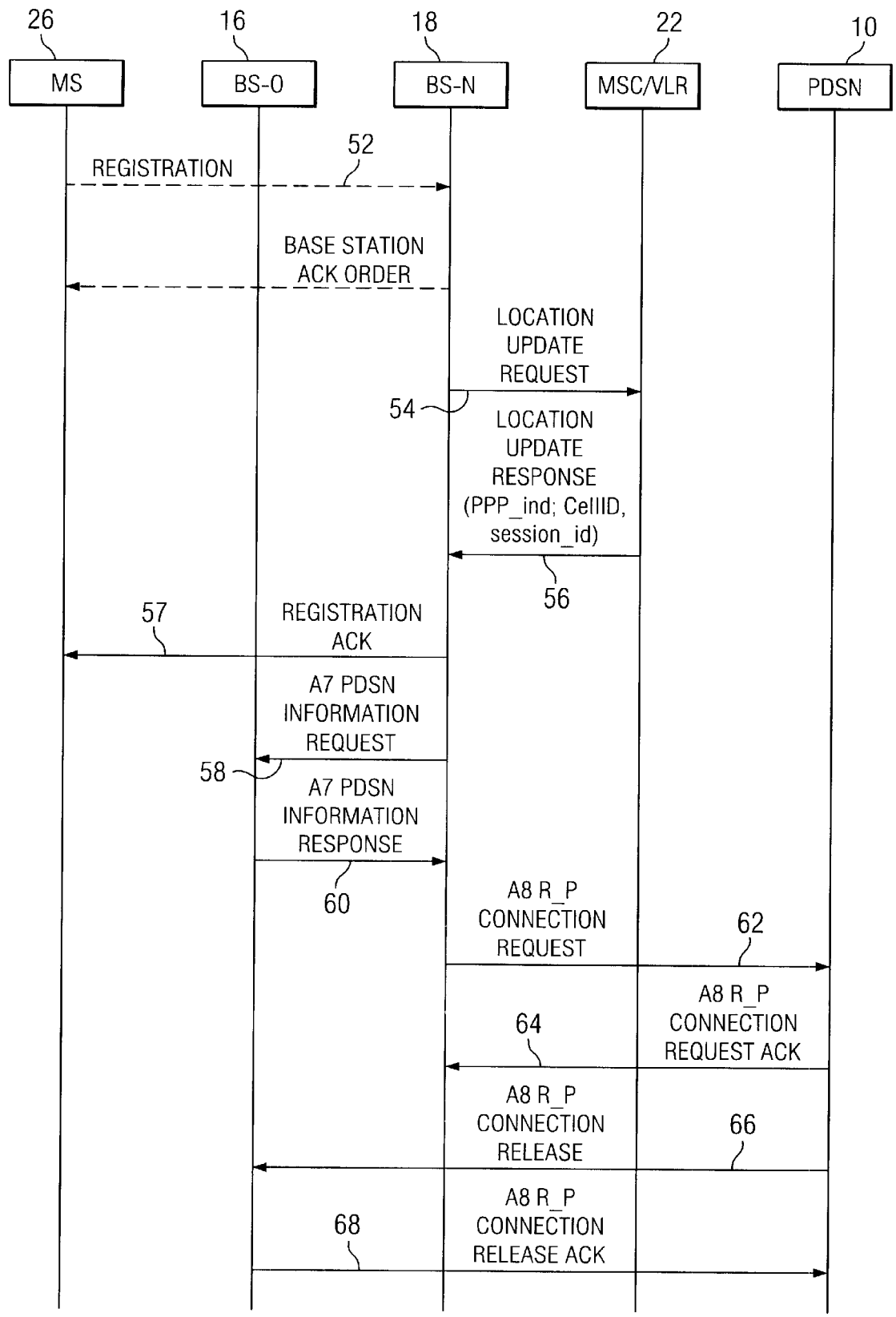
FIG. 4 is a call flow diagram according to another embodiment of the present invention that updates an R-P connection during a regular mobile registration process by using a communication link between two base station controllers.

Referring to FIG. 4, a call flow diagram 50 illustrates another embodiment of the present invention that updates an R-P connection during a regular registration by using a communication link between the BS-O 16 and the BS-N 18. In this embodiment, steps 52, 54, 56, and 57 are similar to steps 38, 39, 40, and 41, respectively. Thus through steps 52 and 56, the MSC/VLR 22 can only send information about the previously registered Cell_ID, a session_ID, and a PPP identifier in the Location Updating Accept message to the BS-N.

At step 58, the BS-N 18 can use information received from the MSC/VLR 22 to locate the BS-O 16 and send an A7 PDSN Info Request message to the BS-O 16 through an A Interference Link. At step 60, once the connection is made between the BS-N 18 and the BS-O 16, the BS-O 16 sends information about the old R-P connection 32 (FIG. 2) and the associated PDSN 10 in another A7 PDSN Info Request message back to the BS-N 18. At steps 62–64, with this information, the BS-N 18 communicates with the PDSN 10 and establishes the new R-P connection 34 with the PDSN 10 through an A8 R-P Connection Request and Ack messages. At steps 66–68, the PDSN 10 is then directed to communicates with the BS-O 16 to clear the old R-P connection 32.

Figure 5:
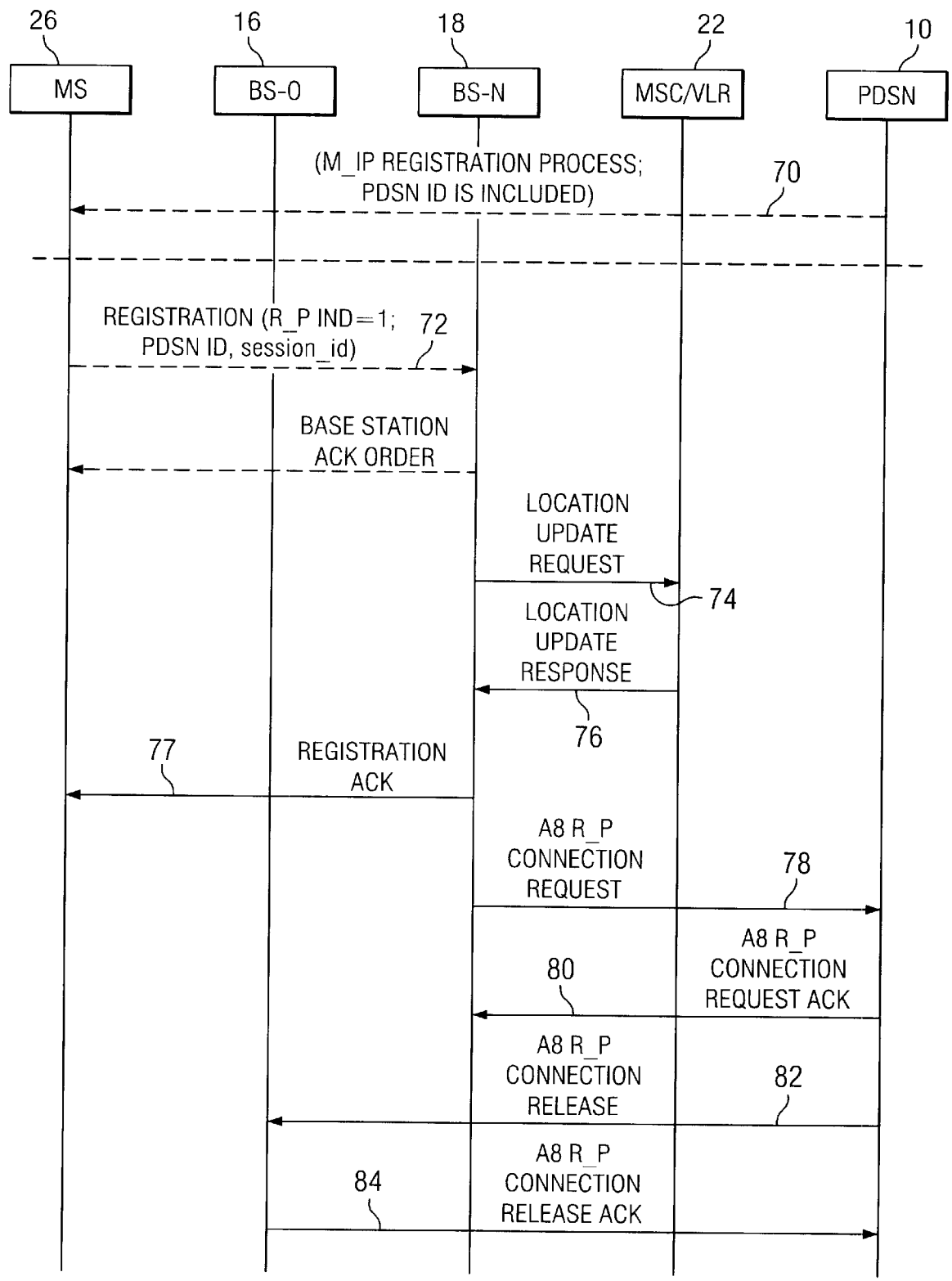
FIG. 5 is a call flow diagram according to yet another embodiment of the present invention to establish a new R-P connection with the assistance of the MS.

Referring to FIG. 5, a call flow diagram 69 illustrates another embodiment of the present invention for establishing a new R-P connection. The call flow 69 utilizes the MS 26 for providing information about the PDSN 10. In this embodiment, the MS 26 takes stores information about the PDSN 10 and the related R-P connection 32.

At step 70, during an M-IP registration, the PDSN 10 sends information about the PDSN 10 (such as the PDSN_ID) to the MS 26. At step 72, during a mobile registration process, the MS 26 uses a Register message to send information about a PPP session status, including current PDSN 10 information, to the BS-N 18. At steps 74–76, having the information about the PDSN 10 on hand, the BS-N 18 communicates with the MSC/VLR 22 to update the location of the MS 26. At steps 78–80, a new R-P connection 34 is negotiated and established between the PDSN 10 and the BS-N 18, while the old R-P connection 32 is torn down at steps 82 and 84. It is understood that in this embodiment, the MS 26 actively participates in the entire process to select an appropriate PDSN based on its stored information about the prior PDSN connection.

As an alternative, at step 72, the MS 26 can provide information about the BS-O 16 to the BS-N 18. Using this information, the BS-O 16 and BS-N 18 can establish a routing connection there between so that packet data can be transferred between the MS 26 and the PDSN 10 through the old R-P connection and the routing connection without establishing a new R-P connection.

Figure 6:
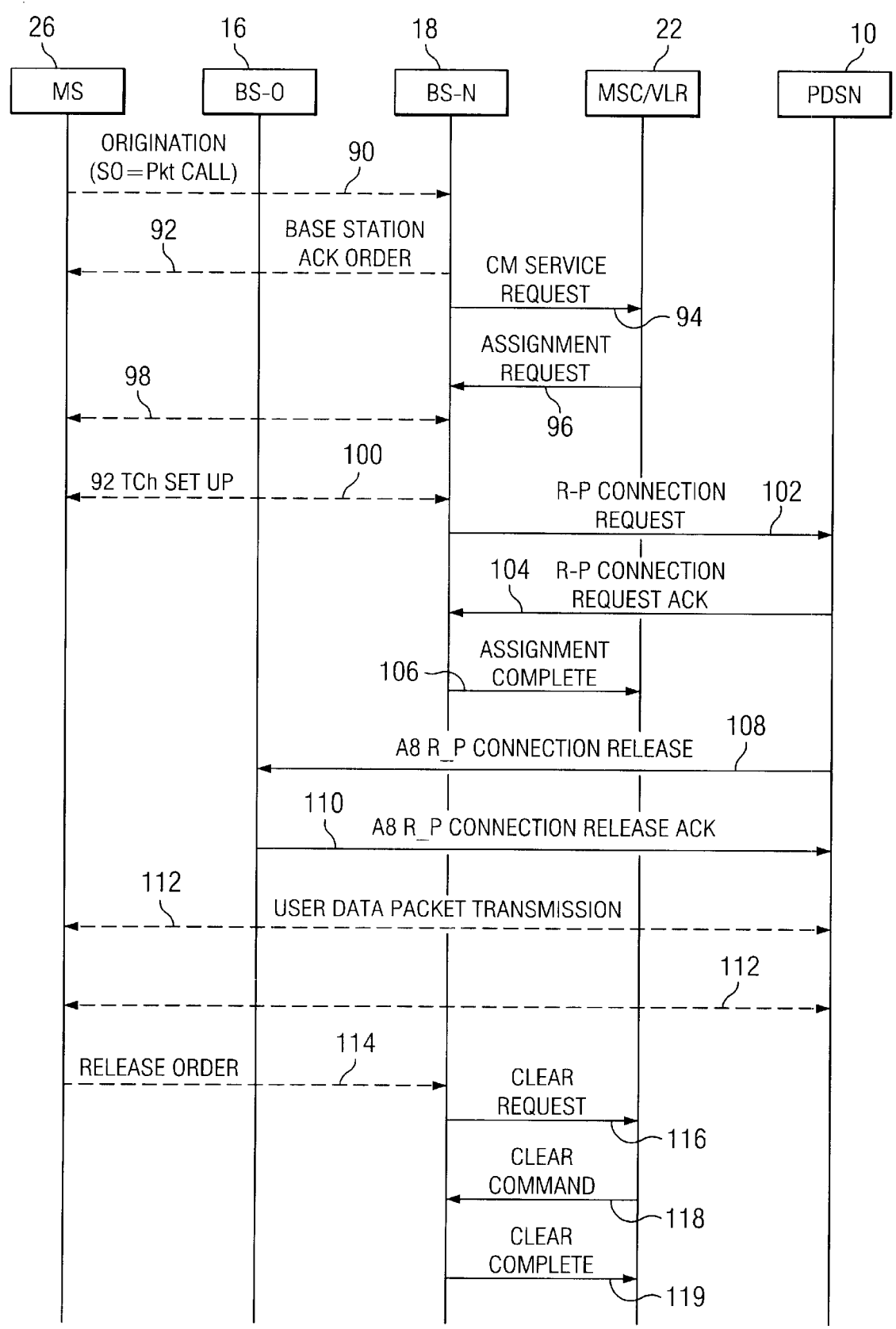
FIG. 6 is a call flow diagram according to still another embodiment of the present invention for establishing an R-P connection during an origination process when an MS prepares to transmit data after it has roamed from one radio network to another radio network.

Referring to FIG. 6, a call flow diagram 88 illustrates another embodiment of the present invention for establishing an R-P connection during a mobile origination process. The call flow 88 can be performed while a MS 26 prepares to transmit data, even after it has roamed from one RN to another RN. In this embodiment, the MS 26 does not immediately change the PDSN connection when it first roams into the new RN. It will only attempt to do so when it is ready to transmit packet data. Consequently, from the time the MS 26 roams into the coverage area of a new RN to the time it tries to transmit data, the old PDSN connection remains in tact.

In this embodiment, the MSC/VLR 22 stores information about the prior PDSN and the R-P connection. At step 90, the dormant MS 26 has moved to the coverage area of the BS-N 18, "wakes up," and transmits an Origination message over an access channel to the BS-N 18 to request a packet data service. At step 92, the BS-N 18 acknowledges the receipt of the Origination message and at step 94, sends a CM Service message in a Complete Layer 3 Information format to the MSC/VLR 22.

At step 96, the MSC/VLR 22 then sends an Assignment Request message to request assignment of radio resources from the BS-N 18. In the message, information for the old R-P connection 32 and associated PDSN 10 is included. At steps 98 and 100, the BS-N 18 communicates with the MS 26 to set up a traffic channel there between. Right after, at steps 102 and 104, the BS-N 18 and the PDSN 10 complete the establishment of the new R-P connection 34. At step 106, the BS-N 18 indicates the completion of the new traffic channel and the R-P connection 34 to the MSC/VLR 22. At steps 108–110, the old R-P connection 32 is then released. At step 112, the MS 26 can start to transmit packet data through packet data services provided by the new R-P connection between the MS 26 and the PDSN 10.

At step 114, upon completion of a packet data transmission, if the MS 26 decides to go to the dormant state while still maintaining the PPP connection and the R-P connection, it sends a Release Order message to the BS-N 18. Since the MS 26 is going dormant, the radio resources can be freed to serve other needs of the system. At step 116, the BS-N 18 sends a Clear Request message to the MSC/VLR 22 to initiate a radio resource release transaction. At step 118, the MSC/VLR 22 delivers a Clear Command message to the BS-N 18 to instruct it to release certain dedicated resources previously assigned for the MS's communication. Upon releasing the radio resources, the BS-N 18 signals the MSC/VLR 22 by sending a Clear Complete message at step 119. In fact, the MS 26 may go dormant as soon as the Release Order message is sent.

Figure 7:
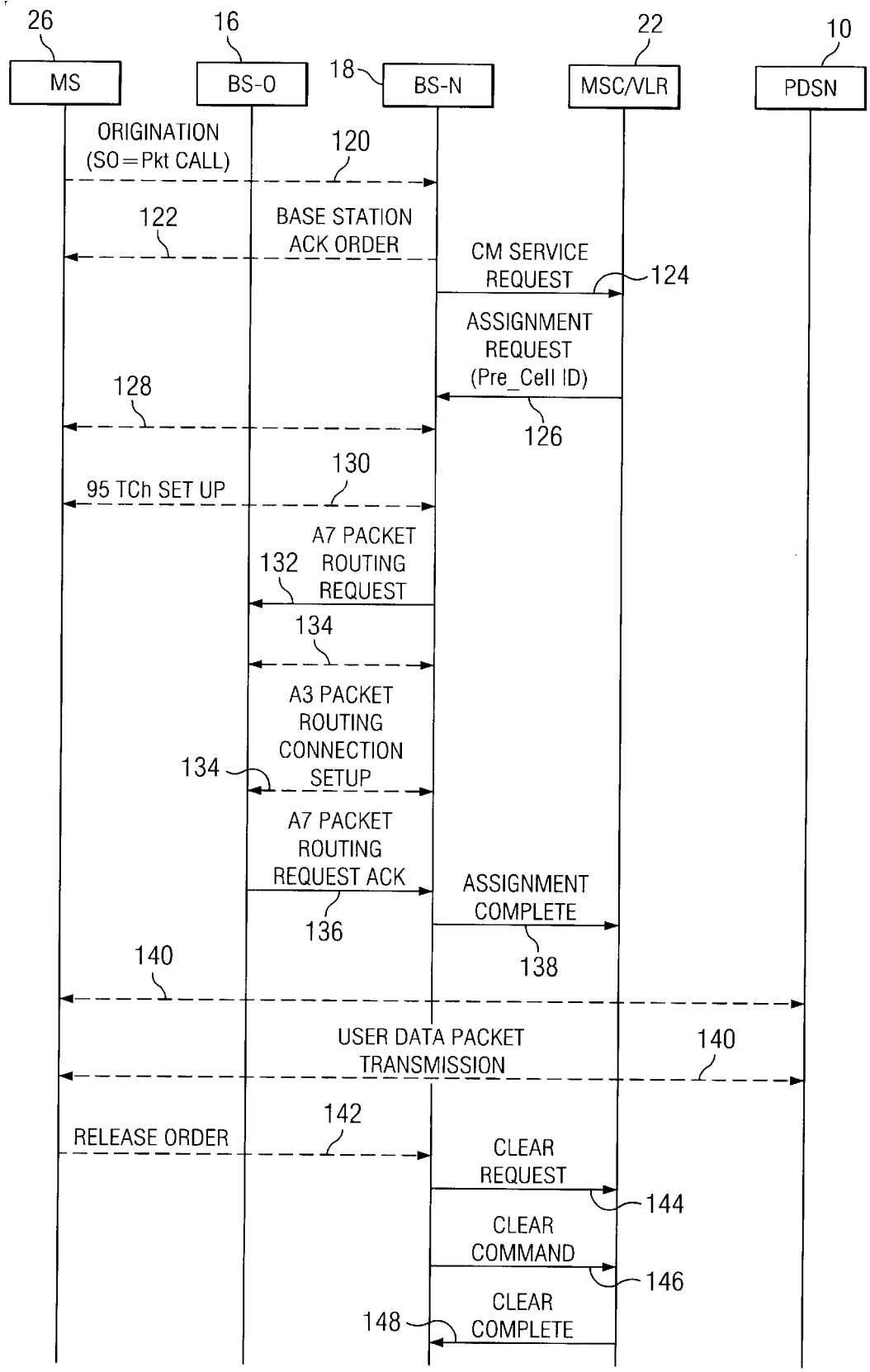
FIG. 7 is a call flow diagram illustrating the process for relaying packet data traffic from one base station controller to another during an origination process.

Referring to FIG. 7, a call flow diagram 120 illustrates an embodiment of the present invention for establishing a new R-P connection. The call flow 120 relays the traffic from the BS-N 18 to the BS-O 16 during an origination process. In this case, steps 121, 122, 124, 126, 128, and 130 are similar to steps 90, 92, 94, 96, 98, and 100, respectively, in FIG. 6 as described above. Once the radio resources are assigned, a traffic channel is set up between the MS 26 and the BS-N 18. When the BS-N 18 detects no existing R-P connection, it can find information about the BS-O 16 through parameters such as Cell_ID, which has been sent from the MSC/VLR 22 to the BS-N 18 at step 126. Therefore, the BS-N 18 can choose not to establish any new R-P connection, but instead route the packet data it receives to the BS-O 16. In order to make such a connection with the BS-O 16, the BS-N 18 can do so through an A3 packet routing connection setup process.

At steps 132, 134, and 136, the BS-N 18 and the BS-O 16 establish the packet routing connection through messages such as an A7 Packet Routing Request, an A3 Packet Routing Connection Setup, and an A7 Packet Routing Ack. At steps 138 and 140, after the MSC/VLR 22 is informed about the completion of the traffic and packet routing connections, data packets are freely transferred between the MS 26 and the PDSN 10. In this case, the packet traffic is routed from the MS 26 to the BS-N 18, to the BS-O 16 through the established routing connection, and from the BS-O 16 to the PDSN 10 via the existing and unchanged R-P connection 32. If at the end of a packet transmission the MS 26 goes to a dormant state, steps 142, 144, 146, and 148 can be taken similar to steps 114, 116, 118, and 119, respectively, in FIG. 6.

Figure 8:
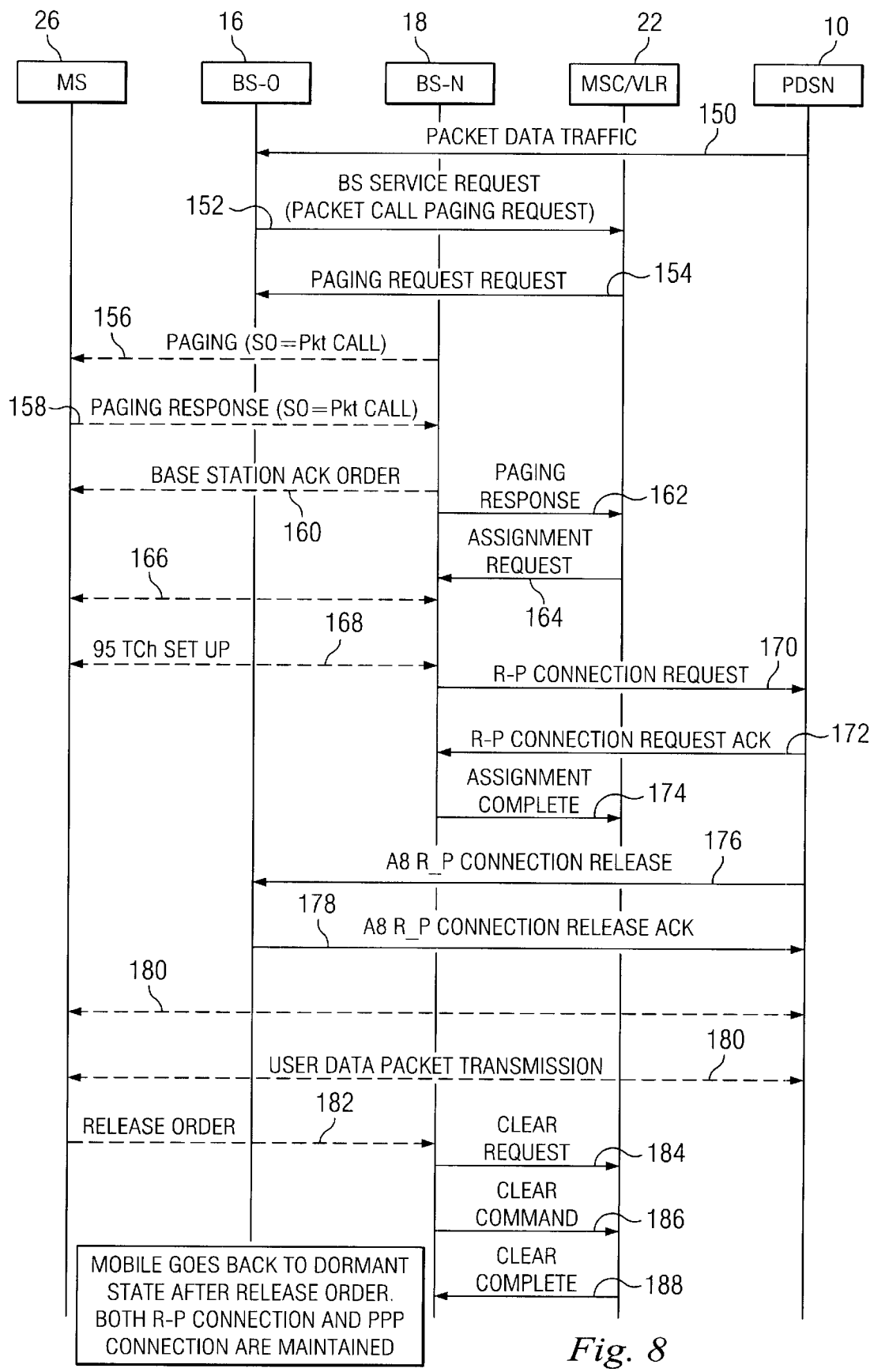
FIG. 8 is a call flow diagram illustrating the construction of an R-P connection during a mobile termination process according to another embodiment of the present invention.

Referring to FIG. 8, a call flow diagram 149 illustrates an embodiment of the present invention for construction of a new R-P connection. The call flow 149 can be performed during a mobile termination process according to another embodiment of the present invention. The BS-O 16 may prepare to transmit data to the MS 26 after the MS 26 has roamed into the coverage area of the BS-N 18. In this embodiment, the R-P connection is not changed when the MS 26 first roams into the coverage area of the BS-N 18 from that of the BS-O 16. Therefore, from the time that the MS 26 leaves the coverage area of the BS-O 16 to the time when data arrives in the BS-O 16 from the PDSN 10, the R-P connection has been preserved.

At step 150, the PDSN 10 sends data packets to the BS-O 16 on the existing R-P connection 32. At step 152, the BS-O 16 initiates a Paging process by sending a BS Service Request message to the MSC/VLR 22 for locating the MS. This message may include information for identifying certain MSs (e.g., mobile identification parameters such as MIN or IMSI). Then at step 154, the MSC/VLR 22 sends a Paging Request message to start a mobile terminated packet data call setup process. This message can be sent to either all BSCs under the coverage of the PDSN 10 if the MSC/VLR 22 does not use a "zone paging technique," or as an alternative, sent to all BSCs in the entire communication system in which the PDSN is located. At step 156, the BS-N 18 pages all MSs under its coverage in a paging message, and at step 158, the MS 26 responds to the BS-N 18 (instead of the BS-O 16) through a paging response message since it is now in the coverage area of BS-N 18. Further at step 160, the BS-N 18 acknowledges the communication with the MS 26 by sending a Base Station Ack Order message to the MS 26.

Immediately thereafter at step 162, the BS-N 18, in lieu of the BS-O 16, responds to the MSC/VLR's paging process by constructing and sending a Paging Response message in a Complete Layer 3 Information format. Then at step 164, the MSC/VLR 22 sends an Assignment Request message to the BS-N 18 to provide information about packet data call status information such as the PDSN_ID for the BS-N 18 to establish a new R-P connection. After a traffic channel is established at steps 166 and 168, the new R-P connection 34 is then constructed at steps 170 and 172 and the communication resources assignment is completed at step 174. Steps 176, 178, 180, 182, 184, 186, and 188 are similar to corresponding steps described in FIG. 6 which carry out the functions of releasing the old R-P connection 32, and releasing the radio sources while the MS 26 goes dormant.

Figure 9:
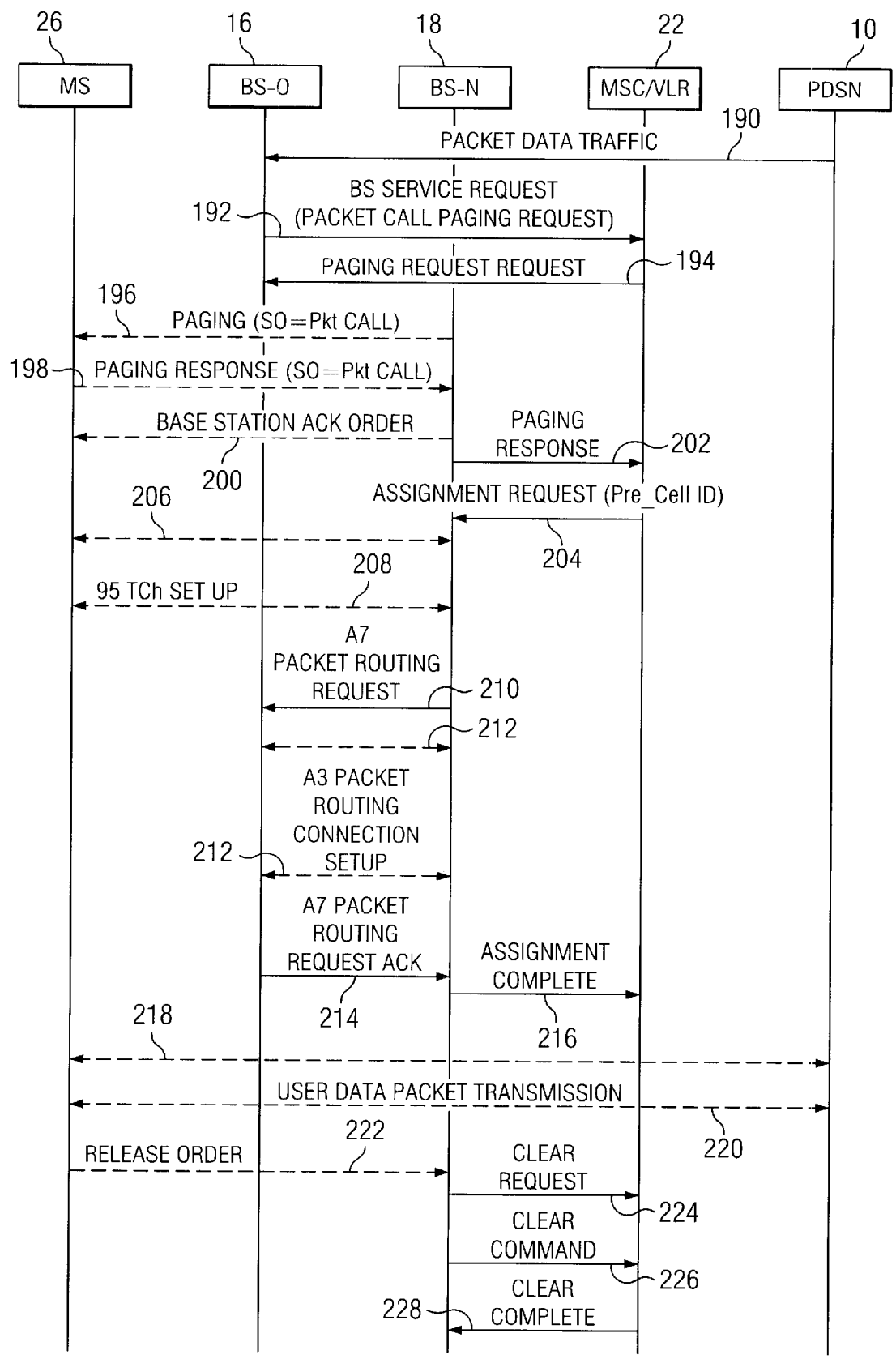
FIG. 9 is a call flow diagram illustrating a process for updating an R-P connection during a mobile termination process by relaying the packet traffic from one base station controller to another.

Referring to FIG. 9, a call flow diagram 189 illustrates an embodiment of a process for updating an R-P connection during a subsequent termination process by relaying the packet traffic through the BS-O 16. In the present embodiment, steps 190, 192, 194, 196, 198, 200, 202, 204, 206, and 208 are similar to steps 150, 152, 154, 156, 158, 162, 164, 166, and 168, respectively, in FIG. 8, by using a paging method to establish a traffic channel between the BS-N 18 and the MS 26. Thereafter, similar to what has been described regarding steps 132, 134, and 136 of FIG. 7, messages such as an A7 Packet Routing Request, an A3 Packet Routing Connection Setup, and an A7 Packet Routing Request Ack are used to construct a routing connection between the BS-O 16 and the BS-N 18. Hence, the packet traffic can be routed from the BS-N 18 to the BS-O 16, and then from the BS-O 16 to the PDSN 10 via the existing R-P connections 32. Steps 216, 218, 220, 222, 224, 226, and 228 are similar to process steps described in FIG. 7 and 8, which help the MS 26 and the PDSN 10 to communicate and releases the assigned radio resources once the MS 26 goes back to dormant. In any case, the R-P connection 32 and the PPP connection are maintained.

Figure 10:
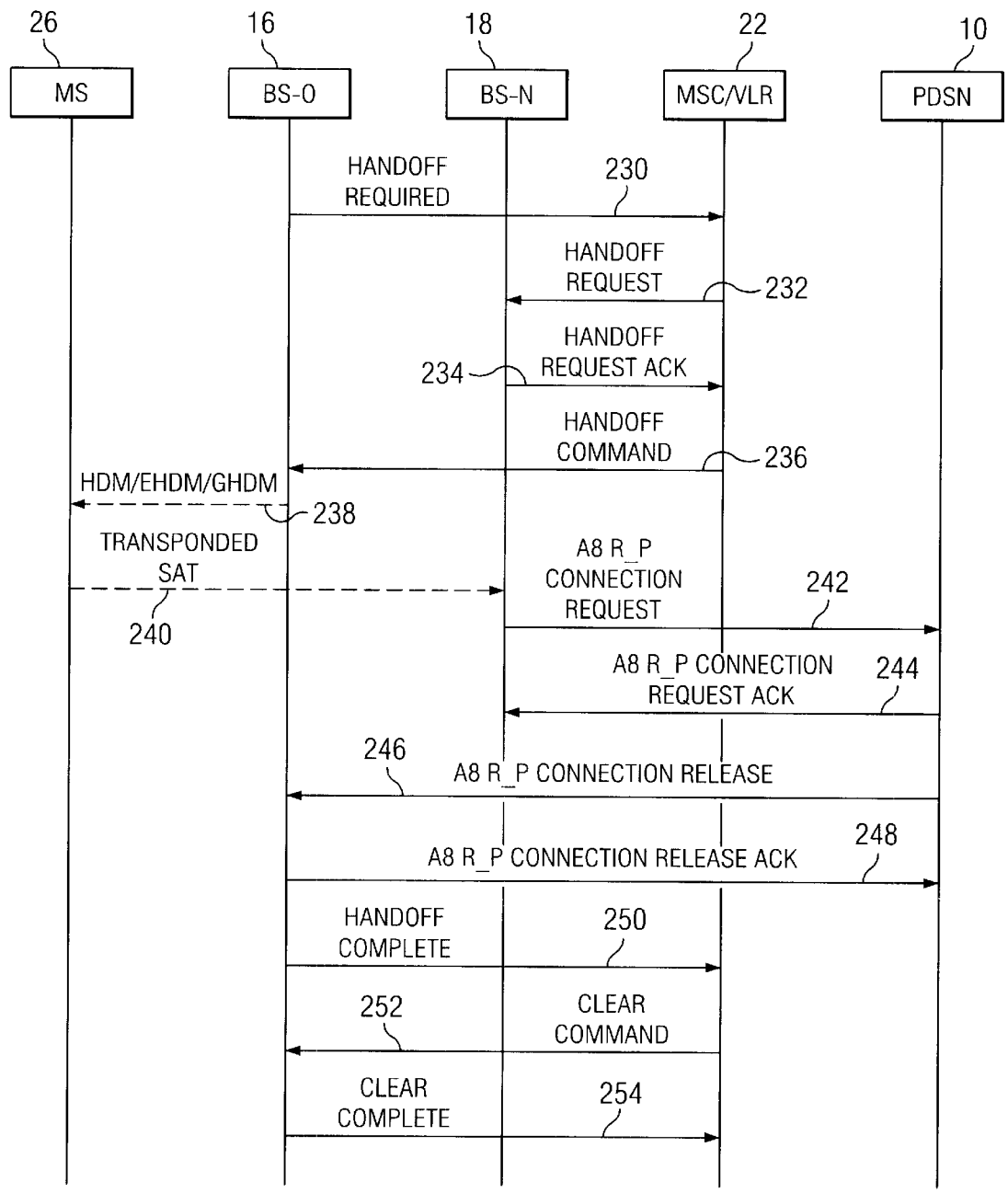
FIG. 10 is a call flow diagram for an inter-BSC hard handoff within the same PDSN 10 for a roaming MS 26.

Referring now to FIG. 10, a call flow diagram 229 illustrates an embodiment of an inter-BSC hard handoff within the same PDSN 10 for a roaming MS 26. It is assumed that the handoff is from an IS-2000 or TIA/EIA-95 system to another similar system. It is also assumed that an IS-2000 or TIA/EIA-95 call is not in the inter-BSC soft (or softer) handoff prior to the hard handoff. Consequently, there is no need to remove any A3 connections.

The call flow 229 begins when the MS 26 roams from one RN to another, and in so doing has crossed certain predetermined threshold values that trigger a hard handoff. At step 230, the BS-O 16 sends a Handoff Required message with a list of related cells to the MSC/VLR 22. The message may also include information about the existing R-P connection 32 and the associated PDSN. Steps 232 and 234 complete a communication session between the BS-N 18 and the MSC/VLR 22 to prepare for the hard handoff. Among other things, the BS-N 18 attempts to allocate appropriate radio resources for the upcoming handoff.

At step 236, when the MSC/VLR 22 sends a Handoff Command message to the BS-O 16, the BS-O 16 is now ready for the handoff. At step 238, the BSO 16 may send an Extended Handoff Direction Message or General Handoff Direction Message to the MS 26, but it may not require an acknowledgment message to be sent back from the MS 26. At step 240, a Transponded SAT message may be sent from the MS 26 to the BS-N 18.

Once the hard handoff from the BS-O 16 to the BS-N 18 is complete, steps 242 and 244 set up a new R-P connection 34 via messages between the BS-N 18 and the PDSN 10. After the new R-P connection 34 is established, the old R-P connection 32 is abolished at steps 246 and 248. At step 250, the BS-O 16 sends a Handoff Complete message to the MSC/VLR 22. At step 252 the MSC/VLR 22 sends a Clear Command to the BS-O 16 for releasing unneeded radio resources. At step 252, and the BS-O 16 sends a Clear Complete message to the MSC/VLR 22 to notify the MSC/VLR 22 that the resource releasing process has been accomplished.

It is understood that in many of the above described embodiments, if the MS can be connected back to a prior PDSN that it has established a connection with when the MS was in a first radio network, the prior PDSN is used for communicating to the MS while the MS is in the second radio network. This can be accomplished by maintaining a prior R-P connection with the prior PDSN or establishing a new R-P connection with the prior PDSN. If the prior PDSN is no longer reachable by the BSC in the second radio network, the new R-P connection may be established between the new PDSN and the second BSC for providing packet data services there between.

The above disclosure provides many different embodiments, or examples, for implementing different features of the invention. Specific examples of components, and processes are described to help clarify the invention. These are, of course, merely examples and are not intended to limit the invention from that described in the claims.

While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A method for updating a radio network to packet data serving node (PDSN) a first R-P connection while a mobile station (NMS) moves from a first radio network to a second radio network, the first radio network being serviced by a first base station controller (BSC) and the second radio network being serviced by a second BSC, the method comprising the steps of:

storing packet data session information including information about the first R-P connection and an associated PDSN when the MS is in the first radio network; and
  transferring the stored information to the second BSC when the MS moves into the second radio network, thereby allowing the second radio network to update the first R-P connection.

2. The method of claim 1 further comprising:
if the MS can be connected back to the PDSN, using the PDSN for communicating to the MS while it is in the second radio network either by maintaining the first R-P connection with the PDSN or establishing a second R-P connection with the PDSN; and
if the PDSN is not reachable by the second BSC, establishing a third R-P connection between a new PDSN and the second BSC for providing packet data services there between.

3. The method of claim 2 wherein the packet data session information is stored in a Mobile Service Center (MSC).

4. The method of claim 2 wherein the packet data session information is stored in a Visitor's Location Register (VLR).

5. The method of claim 2 wherein the packet data session information is stored in the MS.

6. The method of claim 1 wherein the step of transferring is done in a hard handoff process.

7. The method of claim 1 wherein the packet data session information is stored in a Mobile Service Center (MSC).

8. The method of claim 1 wherein the packet data session information is stored in a Visitor's Location Register (VLR).

9. The method of claim 1 wherein the packet data session information is stored in the MS.

10. A method for updating a radio network to a packet data serving node (PDSN) a first R-P connection while a mobile station (MS) moves from a first radio network to a second radio network, the first radio network being serviced by a first base station controller (BSC) and the second radio network being serviced by a second BSC, the first BSC having the first R-P connection with the PDSN, the method comprising the steps of:
storing packet data session information including information about the first R-P connection and the PDSN in a Mobile Service Center (MSC) when the MS is in the first radio network; and
transferring the stored information to the second BSC after the MS moves into the second radio network thereby allowing the second radio network to update the first R-P connection.

11. The method of claim 10 further comprising the steps of:
if the MS can be connected back to the PDSN through either the first R-P connection or a second R-P connection between the second BSC and the PDSN, communicating to the MS through the PDSN while the MS is in the second radio network; and
if the PDSN is not reachable by the second BSC, establishing a third R-P connection between the second BSC and a new PDSN for providing packet data services between.

12. The method of claim 10 wherein the packet data session information is stored in a Visitor's Location Register (VLR) associated with the MSC.

13. The method of claim 10 wherein the step of transferring includes the step of transferring the stored information to the second BSC during a mobile origination process when the MS has packet data to be sent.

14. The method of claim 10 wherein the step of storing further includes a step of sending the information from the first BSC to the MSC in a communication message.

15. The method of claim 10 wherein the step of transferring further includes the steps of:
registering the MS with the second BSC when it moves into the second radio network;
triggering a message to be sent from the second BSC to the MSC to update the location of the MS; and
sending the stored information about the first R-P connection and the PDSN from the MSC to the second BSC,
whereby the stored information directs the second BSC to communicate with the PDSN for updating the first R-P connection with the PDSN.

16. The method of claim 10 wherein the step of updating the first R-P connection with the first PDSN further includes the steps of:
establishing a second R-P connection between the second BSC and the PDSN; and
abandoning the first R-P connection between the first BSC and the PDSN.

17. The method of claim 10 wherein the step of transferring further includes the steps of:
triggering the second BSC to communicate with the MSC to obtain the stored information about the first BSC;
establishing a routing connection between the second BSC and the first BSC; and
routing packet data transferred between the MS and the PDSN through the first R-P connection and the established routing connection between the first and the second BSCs.

18. The method of claim 17 wherein the second BSC communicates with the MSC during a mobile origination process of the MS.

19. The method of claim 17 further includes a step of establishing a traffic channel between the second BSC and the MS.

20. A method for updating a prior radio network to packet data serving node (PDSN) a first R-P connection while a mobile station (MS) moves from a first radio network to a second radio network, the first radio network being serviced by a first base station controller (BSC) and the second radio network being serviced by a second BSC, the first BSC having the first R-P connection with the PDSN, the method comprising the steps of
storing packet data session information including information about the first R-P connection and the PDSN in a Mobile Service Center (MSC) when the MS is in the first radio network; and
transferring the stored information to the second BSC after the MS moves into the second radio network thereby allowing the second radio network to update the first R-P connection wherein the transferring includes paging the first BSC by the PDSN for locating the MS; requesting the MSC to page a predetermined set of BSCs affiliated with the MSC; locating the MS by the second BSC through a paging process; transferring the stored information from the MSC to the second BSC; and establishing a second R-P connection between the second BSC and the PDSN.

21. The method of claim 20 further includes a step of abandoning the first R-P connection between the first BSC and the first PDSN.

22. The method of claim 20 wherein the step of paging is conducted when packet data need to be sent from the PDSN to the MS.

23. The method of claim 20 wherein the step of paging is conducted during a mobile termination process.

24. A method for updating a radio network to packet data serving node (PDSN) a first R-P connection while a mobile station (MS) moves from a first radio network to a second radio network, the first radio network being serviced by a first base station controller (BSC) and the second radio network being serviced by a second BSC, the first BSC having the first R-P connection with the PDSN, the method comprising the steps of:

storing packet data session information including information about the first R-P connection and the PDSN in a Mobile Service Center (MSC) when the MS is in the first radio network; and transferring the stored information to the second BSC after the MS moves into the second radio network thereby allowing the second radio network to update the first R-P connection wherein the transferring includes paging the first BSC by the PDSN for locating the MS; requesting the MSC to page a predetermined set of BSCs affiliated with the MSC; locating the MS by the second BSC through a paging process; transferring the stored information from the MSC to the second BSC; establishing a routing connection between the second BSC and the first BSC based on the transferred information; and routing packet data transferred between the MS and the PDSN through the first R-P connection and the established routing connection between the first and the second BSCs.

25. The method of claim 24 wherein the step of paging is conducted during a mobile termination process.

26. A method for updating a first radio network to a packet data serving node (PDSN) a first R-P connection while a dormant mobile station (MS) moves from the first radio network to a second radio network, the first radio network being serviced by a first base station controller (BSC) and the second radio network being serviced by a second BSC, the first radio network having the first R-P connection between the first BSC and a packet data serving node (PDSN), the method comprising the steps of:

storing packet data session information including information about the first R-P connection and the PDSN in the MS when the MS is in the first radio network; and transferring the stored information to the second BSC during a registration process of the MS when the MS moves into the second radio network thereby allowing the second radio network to update the first R-P connection.

27. The method of claim 26 wherein if the MS can be connected back to the PDSN through either the first R-P connection or establishing a second R-P connection between the second BSC and the PDSN, the PDSN is used for communicating to the MS while the MS is in the second radio network, and if the PDSN is not reachable by the second BSC, the third R-P connection is established between the second BSC and a new PDSN for providing packet data services between.

28. The method of claim 26 wherein the step of storing is conducted during a Mobile IP registration process.

29. The method of claim 26 wherein the step of transferring further includes the steps of:

transferring the stored information to the second BSC from the MS during a mobile origination process; and establishing a second R-P connection between the second BSC and the PDSN based on the transferred information from the MS.

30. The method of claim 29 further includes the step of abandoning the first R-P connection between the first BSC and the PDSN before establishing the second R-P connection.

31. The method of claim 26 wherein the step of transferring further includes the steps of:

transferring the stored information to the second BSC from the MS after the MS moves into the second radio network;

establishing a routing connection between the second BSC and the first BSC based on the stored information, wherein packet data is transferred between the MS and the PDSN through the first R-P connection and the established routing connection between the first and the second BSCs.

32. A method for updating a radio network to packet data serving node (PDSN) a first R-P connection while a dormant mobile station (MS) moves from a first radio network to a second radio network, the first radio network having the first R-P connection with the PDSN, the first radio network being serviced by a first base station controller (BSC) and the second radio network being serviced by a second BSC, the method comprising the steps of:

storing packet data session information including information about the first R-P connection and the PDSN in a Mobile Service Center (MSC) when the MS is in the first radio network;

triggering a hard handoff between the first BSC and the second BSC whereby the stored information is released from the MSC to the second BSC; and updating the first R-P connection between the second BSC and the PDSN, wherein the first R-P connection allows packet data to be sent from the MS to the PDSN there through.

33. The method of claim 32 wherein the packet data session information is stored in a Visitor's Location Register (VLR) associated with the MSC.

34. The method of claim 32 wherein the step of updating further includes the steps of:

establishing a second R-P connection between the second BSC and the PDSN; and abandoning the first R-P connection between the first BSC and the PDSN.

35. A method for updating a first radio network to packet data serving node (PDSN) a first R-P connection while a mobile station (MS) moves from the first radio network to a second radio network, the first radio network being serviced by a first base station controller (BSC) and the second radio network being serviced by a second BSC, the first BSC having the first R-P connection with the PDSN, the method comprising the steps of:

storing information about the first BSC in a Mobile Service Center (MSC) when the MS is in the first radio network;

informing the second BSC the stored information for identifying the first BSC after the MS moves into the second radio network; and transferring information about the first R-P connection and the PDSN from the first BSC to the second BSC in order to establishing a second R-P connection between the second BSC and the PDSN.

36. The method of claim 35 further includes the step of abandoning the first R-P connection after establishing the second R-P connection between the second BSC and the PDSN.

37. The method of claim 35 wherein the information stored by the MSC about the first BSC includes a cell identifier, session identifier, and a point-to-point identifier.

38. The method of claim 35 wherein the step of transferring is conducted through an A interference link.

39. The method of claim 35 wherein the information about the first BSC is stored in a Visitor's Location Register (VLR) associated with the MSC.

40. A system for updating a first radio network to packet data serving node (PDSN) a first R-P connection while a mobile station (MS) moves from the first radio network to a second radio network, the first radio network being serviced by a first base station controller (BSC) and the second radio network being serviced by a second BSC, the system comprising:

means for storing packet data session information including information about the first R-P connection and an associated packet data serving node (PDSN) when the MS is in the first radio network; and means for transferring the stored information to the second BSC when the MS moves into the second radio network thereby allowing the second radio network to update the first R-P connection.

41. The system of claim 40 wherein if the MS can be connected back to the PDSN, the PDSN is used for communicating to the MS while it is in the second radio network either by maintaining the first R-P connection with the PDSN or establishing a second R-P connection with the PDSN, and if the PDSN is not reachable by the second BSC, a third R-P connection is established between a new PDSN and the second BSC for providing packet data services there between.

42. The system of claim 41 wherein the packet data session information is stored in a Mobile Service Center (MSC).

43. The system of claim 41 wherein the packet data session information is stored in a Visitor's Location Register (VLR).

44. The system of claim 41 wherein the packet data session information is stored in the MS.

45. The system of claim 40 wherein the means for transferring is done in a hard handoff process.

46. The system of claim 40 wherein the packet data session information is stored in a Mobile Service Center (MSC).

47. The system of claim 40 wherein the packet data session information is stored in a Visitor's Location Register (VLR).

48. The system of claim 40 wherein the packet data session information is stored in the MS.

* * * * *